United States Patent Office 3,738,806
Patented June 12, 1973

3,738,806
PROCESS FOR THE PREVENTION
OF CORROSION
William A. Feiler, Jr., Kirkwood, Mo., assignor to
Monsanto Company, St. Louis, Mo.
No Drawing. Filed Jan. 26, 1968, Ser. No. 700,730
Int. Cl. C23f *11/16*
U.S. Cl. 21—27    9 Claims

ABSTRACT OF THE DISCLOSURE

A method of inhibiting the corrosion of ferrous metals and nonferrous metals in contact with an aqueous corrosive medium which comprises maintaining in said medium a complex formed by (1) an organo-phosphorus ligand selected from the group consisting of:

(a)
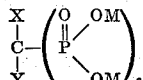

(b)
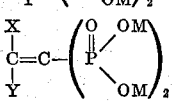

(c) and mixtures thereof
wherein X and Y each are hydrogen, hydroxyl, lower alkyl group containing 1 to 4 carbon atoms, or lower alkenyl group containing 2 to 4 carbon atoms, and M is hydrogen, ammonium, alkali metal or lower alkyl amine and (2) a metal ion which includes zinc, nickel, cobalt, cerium, lead, tin, calcium, ferrous, ferric, chromium, chromic, mercurous, mercuric, or manganese for example, a complex formed by the divalent ion zinc, and the ligand 1-hydroxy-1, 1-ethylidene diphosphonic acid.

---

The present invention relates to corrosion inhibiting compositions and to methods of inhibiting the corrosion of metal surfaces in contact with an aqueous medium of a corrosive nature. More particularly, this invention relates to methods of inhibiting the corrosion of metal surfaces by utilizing in the corrosive aqueous medium a complex formed by an organo-phosphorus ligand and a metal ion.

The present invention has special utility in the prevention of the corrosion of metals which are in contact with circulating water, that is, water which is moving through condensers, engine jackets, cooling towers or distribution systems, however, it can be used to prevent the corrosion of metal surfaces in other aqueous corrosive media. This invention is especially valuable in inhibiting the corrosion of ferrous metals including iron and steel and non-ferrous metals including copper and brass. These metals are generally used in circulating water systems.

The major corrosive ingredients of aqueous cooling systems are primarily dissolved oxygen and inorganic salts, such as the carbonate, bicarbonate, chloride and/or sulfate salts of calcium, magnesium and/or sodium. Other factors contributing to corrosion are pH and temperature. Generally, an increase in the temperature and the pH accelerates corrosion.

It is well-known that the polyphosphates inhibit or prevent corrosion in cooling waters; however, their use is limited, due to their tendency, among other things, to hydrolyze, forming appreciable amounts of orthophosphates. This reversion is much more rapid at temperatures above 50° C., and consequently decreases their effectiveness at elevated temperatures. Generally speaking, the polyphosphates are preferred to the orthophosphates as they provide superior corrosion inhibition.

It has been found that by employing in the aqueous corrosive medium an organo-phosphorus ligand metal ion complex that the corrosion of the above-mentioned metals used mainly in cooling systems is significantly decreased. It has also been found that said complex is stable over a long period of time, at temperatures above 300° C.

It is, therefore, a primary object of this invention to provide new corrosion inhibiting methods.

It is another object of this invention to provide new corrosion inhibiting methods for ferrous metals including iron and steel and non-ferrous metals including copper and brass.

It is another object of this invention to provide new corrosion inhibiting methods for ferrous metals including iron and steel and non-ferrous metals including copper and brass in contact with an aqueous corrosive medium.

It is another object of this invention to provide new corrosion inhibiting methods for ferrous metals including iron and steel and non-ferrous metals including copper and brass in contact with cooling waters.

Other objects will be apparent from the following discussion:

The foregoing objects are accomplished by maintaining in the aqueous corrosive medium a complex formed by (1) an organo-phosphorus ligand selected from the group consisting of:

(a)
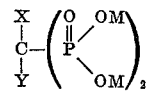

(b)
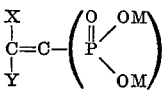

(c) and mixtures thereof;
wherein X and Y each are hydrogen, hydroxyl, lower alkyl group containing 1 to 4 carbon atoms, or lower alkenyl group containing 2 to 4 carbon atoms; M is hydrogen, ammonium, alkali metal, or lower alkyl amine; and (2) a metal ion which includes zinc, nickel, cobalt, cerium, lead, tin, calcium, ferrous, ferric, chromium, chromic, mercurous, mercuric or manganese; the mole ratio of the metal ion to ligand being from about 3:1 to about 1:100; and the amount of said complex maintained in said medium being at least about 3 parts per million. By using the complex of the present invention, iron, steel, copper or brass surfaces, respectively, can be protected from corrosion caused by aqueous corrosive media, more particularly, by cooling waters. By cooling waters, it is meant that water is used as a coolant, and at least the main body of the aqueous medium is recirculated in the system. Cooling water systems are used in oil refining processes, in air-conditioning units, heat exchangers and automobile engine jackets. As would be expected, the capital investments in cooling systems are appreciable; therefore, corrosion must be minimized to insure normal usage of this equipment.

The metal ions that can be used include zinc, nickel, cobalt, cerium, lead, tin, ferrous, ferric, chromium, chromic, mercuric, mercurous and manganese. Extremely good corrosion inhibition has resulted when a divalent metal ion is used with the organo-phosphorus ligand, and it is preferred that a divalent metal ion be used.

The mole ratio of metal ion to organo-phosphorus ligand ranges from about 3:1 to about 1:100, preferably from about 2:1 to about 1:10. It is more preferred to have an excess of ligand in terms of a metal to ligand mole ratio of about 1:1.1 to about 1:3.

Whether or not excess ligand will be present in the aqueous medium depends upon the particular metal ion. For example, when the aqueous medium comprises a dispersion of zinc ions and the ligand 1-hydroxy-1,1-ethylidene diphosphonic acid, the mole ratio of zinc to ligand will be in the range of about 1:3 to about 1:1.1, preferably a ratio of from about 1:1.4 to about 1:1.2. When the aqueous medium comprises a dispersion consisting of a complex containing divalent nickel ions and the ligand 1-hydroxy-1,1-ethylidene diphosphonic acid, for example, the metal ion ligand ratio will be a ratio in the range of from about 1:3 to 1:1.1, preferably, from about 1:1.5 to 1:1.3. When the aqueous medium comprises an aqueous dispersion of a complex of divalent managanese ions and the ligand 1-hydroxy-1,1-ethylidene diphosphonic acid, for example, the manganese ion to ligand ratio will be in the range of from about 1:3 to about 1:1.1, preferably, from about 1:2 to about 1:1.2. By way of further example, when the aqueous medium comprises a dispersion consisting of a complex containing divalent nickel ions and the ligand 1-hydroxy-1,1-ethylidene diphosphonic acid, the metal ion ligand ratio will be in the range of from about 2:1 to about 1:10, preferably from about 1:2.5 to about 1:2.

In practicing the present invention, the organo-phosphorus ligand that can be used includes, for example, methylene diphosphonic acid, isopropylidene diphosphonic acid, 1-hydroxy-1,1-ethylidene diphosphonic acid, 1-hydroxy propylidene diphosphonic acid, butylidene diphosphonic acid, 1-hydroxy methylene-1,1-diphosphonic acid, 1,1-ethylidene diphosphonic acid, pentalidene-1,1-diphosphonic acid, and ethylene-1,1-diphosphonic acid.

As noted hereinbefore, M in the formulae:

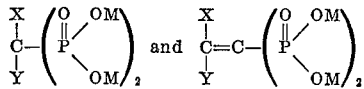

may be either hydrogen or alkali metal cations. It is preferred that M be an alkali metal cation such as sodium, potassium, and lithium; and it is particularly preferred that M be sodium. Examples of these organo-phosphorus ligands include, for example, tetrapotassium 1-hydroxy ethylidene diphosphonate and tetra sodium 1-hydroxy ethylidene diphosphonate.

It has been found that to effectively inhibit corrosion, at least 3 parts per million, preferably from about 10 parts per million to about 500 parts per million, more preferably from about 10 parts per million to about 150 parts per million of the organo-phosphorus metal ion complex should be utilized in the corrosive medium. A preferred example of an organo-phosphorus ligand is 1-hydroxy-1,1-ethylidene diphosphonic acid zinc complex used in amounts of at least 3 parts per million and preferably in amounts from about 10 parts per million to about 150 parts per million. Another example is ethylene-1,1-diphosphonic acid zinc complex used in amounts of at least 3 parts per million and preferably from about 10 parts per million to about 150 parts per million.

The corrosion inhibitors of the present invention are effective in both an acidic or basic corrosive media. The pH can range from about 4 to about 12. For example, 1-hydroxy-1,1-ethylidene diphosphonic acid zinc complex used in amounts from about 10 parts per million to about 150 parts per million is an effective corrosion inhibitor in a corrosive medium where the pH is from about 4 to about 12. Likewise a complex of zinc and ethylene-1,1-diphosphonic acid in amounts from 10 parts per million to about 150 parts per million is effective in a corrosive medium having a pH from about 4 to about 12.

Two tests were conducted to determine the effectiveness of the corrosion inhibitors of the present invention in different corrosive media, i.e., ordinary tap water and synthetic cooling tower water.

Test 1 was conducted at room temperature, about 70° F., wherein several coupons of mild steel (S.A.E. 1018) having dimensions of 5 cm. x 3.5 cm. x 0.32 cm. were thoroughly cleaned using a commercially available cleansing powder and rinsed with distilled water and acetone.

After the coupons were weighed, they were mounted on brackets and continuously immersed and removed from the corrosion composition, i.e., ordinary tap water, so that the coupons remain immersed in the composition for 60 seconds and then remained out of the solution, exposed to air, for 60 seconds. This procedure was continued for a definite length of time (in hours) after which the coupons were withdrawn and the corrosion products on the coupons were removed by using a soft brush.

The coupons were rinsed with distilled water and acetone and then reweighed. The loss in weight (in milligrams) was then appropriately inserted into the equation:

$$\frac{KW}{DAT} = \text{Corrosion in mills per year}$$

wherein

W = weight loss during tests in milligrams;
D = specific gravity of the metal;
A = exposed surface area in square cm.;
T = time of exposure to solution in hours; and
K = 3402 in order to determine the corrosion that has taken place expressed in terms of mils of penetration per year (m.p.y.). The corrosion rate of the coupons protected by a corrosion inhibitor can then be compared to the corrosion rate of the unprotected coupons. A decrease in the corrosion rate indicates the effectiveness of the corrosion inhibitor.

In tests of this nature where the aqueous corrosive medium is ordinary tap water at room temperature, corrosion rates of less than 1 m.p.y. are desired and substances that give this value are considered excellent. This does not mean, however, that substances having a corrosion rate of more than 1 m.p.y. are not valuable, depending upon the particular conditions a compound having a higher corrosion rate may be used, as in an instance where the equipment will be used only for a short period of time.

A cooling water system was constructed on a small scale to approximate actual conditions for Test 2. From a five gallon glass tank containing synthetic cooling water, a hose leads into a 6 in. glass jacket which surrounds a mild steel pipe. A hose leads from the jacket to a glass condenser and then back to the tank. Air is added to the system at the condenser in order to match an actual operation in which air is absorbed by the cooling water. Steam is passed through the steel pipe which is enclosed by the glass jacket.

Four mild steel coupons were weighed and then mounted in the tank. After exposure the steel pipe was checked visibly for signs of corrosion and the corrosion rate of the coupons was calculated. Synthetic cooling water was prepared to approximate actual cooling water as follows:

| | P.p.m. |
|---|---|
| $Ca^{++}$ | 200 |
| $Mg^{++}$ | 55 |
| $Na^{++}$ | 320 |
| $Cl^-$ | 600 |
| $SO_4^{--}$ | 500 |
| $HCO_3^-$ | 58 |
| Total dissolved solids of distilled water | 1,733 |

A circulating cooling water system contains a high concentration of inorganic salt or ions much higher than ordinary tap water as can be seen from the formulation for synthetic cooling tower water. Likewise a cooling water system is operated at high temperatures usually 50° C. or higher. Primarily because of these two factors the acceptable corrosion rates in cooling waters is less than 10 m.p.y. therefore corrosion inhibitors having corrosion rates less than 10 m.p.y. are considered good and commercially acceptable.

The corrosion inhibiting compositions of this invention can be manufactured via a number of methods which will give good protection against corrosion. For example, the organo-phosphorus ligand in the form of its acid or salt and the metal ion in the form of its salt can simply be dissolved by intermixing them into the aqueous corrosion inhibitor, containing some zinc about 1 to about 4% by weight but mostly tetra sodium pyrophosphate about 40 to about 60% by weight; these data are given in Table 1(B).

TABLE 1

Corrosion rates on mild steel (S.A.E. 1018) coupons 5 cm. x 3.5 cm. x 0.32 cm. pH 9.0 to 9.5 of the corrosive media

| Corrosion inhibitor | Concentration, p.p.m. | Time, hour | Corrosion rates (m.p.y.) | Avg. | Reduction, percent |
|---|---|---|---|---|---|
| A. Corrosive medium | | 96 | 25.4, 24.9 | 25.2 | |
| 1-hydroxy-1, 1-ethylidene diphosphonic acid | 50 | 96 | 4.6, 15.6 | 10.1 | 60 |
| Example I (1-hydroxy-1, 1-ethylidene diphosphonic acid zinc complex) | 50 | 96 | 0.2, 0.4 | 0.3 | 99 |
| B. Corrosive medium | | 100 | 29.8, 29.5 | 29.6 | |
| Zinc-tetra sodium pyrophosphate (zinc 1% to 4%, tetra sodium pyrophosphate 40% to about 60%) | 50 | 100 | 3.0, 2.3 | 2.6 | 91 | rosive medium. Via another method the organo-phosphorus ligand in the form of its acid or salt and metal ion in the form of its salt can be dissolved separately in water or another suitable solvent and then intermixed into the aqueous corrosive medium. And still another method is to form the organo-phosphorus ligand and metal ion complex and add this to the corrosive medium.

Various means are available to insure that the correct proportion of organo-phosphorus ligand and metal ion complex are present in the corrosive medium. For example, a solution containing the said complex can be metered into the corrosive medium by a drip feeder. Another method is to formulate tablets or briquettes of the complex and these can then be added to the corrosive medium. The complex, after briquetting, can be used in a standard ball feeder so that the complex is released slowly into the corrosive medium.

The invention will be further illustrated but is not limited by the following examples:

EXAMPLE I

Into a conventional mixing vessel were added 11.5 grams of zinc oxide and 53.5 grams of 1-hydroxy-1,1-ethylidene diphosponic acid (60% active). After mixing, a solid results. Fifty percent sodium hydroxide was added to bring the pH to about 7. Fifty ml. of water and 7.5 grams of 1-hydroxy - 1,1 - ethylidene diphosphonic acid were intermixed raising the pH to about 7.2. The solution contained 13.4% on the active basis of 1-hydroxy-1, 1-ethylidene diphosphonic acid and 1.3 moles of 1-hydroxy - 1,1 - ethylidene diphosphonic acid per mole of zinc.

Six hundred ml. of aqueous corrosive medium was treated with the above solution (Example I) so that it contains 50 parts per million of the 1-hydroxy-1,1-ethylidene diphosphonic acid zinc complex. Test 1 as described hereinbefore was conducted using 1018 S.A.E. mild steel coupons measuring 5 cm. x 3.5 cm. x 0.32 cm. The corrosive medium was a sample of water obtained from the St. Louis County Water Company having a pH from about 9.0 to about 9.5 and a hardness of about 100 to about 110 parts per million as calcium carbonate. Test 1 was conducted according to the procedure hereinbefore outlined for 90 hours. Six hundred ml. of the untreated aqueous corrosive medium and the aqueous corrosive medium treated with only the ligand, 1-hydroxy - 1,1-ethylidene diphosphonic acid were tested along with Example I. The data are illustrated in Table 1.

Test 1 was also conducted on a commercially available

The data in Table 1 show that the divalent metal ion, zinc, enhances the corrosion inhibiting effect of the organophosphorus ligand 1-hydroxy-1,1-ethylidene diphosphonic acid. The corrosion rate of 1-hydroxy-1,1-ethylidene diphosphonic acid is 10.1, a 60% reduction whereas the rate of the 1-hydroxy-1,1-ethylidene diphosphonic acid zinc complex is 0.3, a 99% reduction. Table 1(B) shows that Example I (1-hydroxy-1,1-ethylidene zinc complex) is superior to the commercially available zinc tetra sodium pyrophosphate inhibitor which has a corrosion rate of 2.6, a 91% reduction whereas the rate of Example I is 0.3, a 99% reduction. As pointed out before, substances that reduce the corrosion rates of mild steel to less than 1 m.p.y. in ordinary tap water are considered acceptable. Therefore, it can readily be appreciated that the zinc 1-hydroxy-1,1-ethylidene diphosphonic acid complex of the present invention can be used as an excellent corrosion inhibitor.

Test 2, as described hereinbefore, was conducted to determine the effectiveness of the complex zinc 1-hydroxy-1,1-ethylidene diphosphonic acid (Example I) as a corrosion inhibitor in cooling water. Example I was added to the five gallon tank containing about 16,000 ml. of synthetic cooling tower water, as set forth above, so that said water contains 50 parts per million of zinc 1-hydroxy-1,1-ethylidene diphosphonic acid complex. The temperature of the synthetic cooling water is 50° C. Mild steel coupons (ASTM A–285) measuring 2.5 cm. x 5 cm. x .6 cm. were cleaned with a commercially available cleansing powder and weighed. They were then mounted on brackets in the five gallon tank. After exposure, they were reweighed and their corrosion rates were calculated and are given in Table 2.

Data is also given for the corrosion rates of mild steel coupons in untreated synthetic cooling tower water.

TABLE 2

Corrosion rates on mild steel (ASTM A–285) coupons 2.5 cm. x 5 cm. x 0.6 cm., pH 7.0 of the corrosive medium

| Corrosion inhibitor | Flow, ml./min. | Concentration, p.p.m. | Time, hr. | Corrosion rates (m.p.y.) | Avg. | Reduction, percent |
|---|---|---|---|---|---|---|
| A. Synthetic cooling tower water | 2,640 | 50 | 70 | 20, 20 / 30, 30 | 22.5 | |
| B. Example I (zinc 1-hydroxy-1,1-ethylidene diphosphonic acid) | 2,760 | 50 | 170 | 5, 5 / 5, 6 | 5.3 | 76.5 |

The data show that an inhibitor reducing the corrosion rate to less than 10 m.p.y., which is the generally acceptable rate for a corrosion inhibitor as stated before, would decrease the corrosion by 60%. Example I reduces the corrosion 76.5% and is, therefore, a very good corrosion inhibitor and is commercially acceptable.

A visible inspection of the mild steel pipe through which the steam passed and which was cooled by the synthetic cooling water treated with zinc 1-hydroxy-1,1-ethylidene diphosphonic acid showed a very minute amount of corrosion, another indication of the effectiveness of the novel compound of the present invention.

A commercial corrosion inhibitor containing 2% to 4% by weight of zinc and 40% to 60% by weight of tetra sodium pyrophosphate, was used to treat the synthetic cooling water and tested in the same manner as Example I. The corrosion rates of the coupons were more than 10 m.p.y. and a significant amount of corrosion formed on the mild steel pipe through which the steam passed.

It can readily be appreciated that Example I (zinc 1-hydroxy-1,1-ethylidene diphosphonic acid complex) is a good corrosion inhibitor when used in cooling waters and especially when used in heat-exchanging systems.

EXAMPLE II

Into a conventional mixing vessel were added 4.6 grams of nickel carbonate (45% Ni), 169 grams of water and 29.3 grams of 1-hydroxy-1,1-ethylidene diphosphonic acid. Fifty percent sodium hydroxide was added until a pH of about 7 was reached. More 1-hydroxy-1,1-ethylidene diphosphonic acid was intermixed to lower the pH to about 4. After stirring for about 12 hours, a clear yellow-green solution was formed containing 10.9% on the active basis of 1-hydroxy-1,1-ethylidene diphosphonic acid and containing 1.375 moles of 1-hydroxy-1,1-ethylidene diphosphonic acid per mole of nickel. Six hundred ml. of the aqueous corrosive medium was treated with the above solution so that it contained 50 parts per million of the nickel 1-hydroxy-1,1-ethylidene diphosphonic acid complex. Test 1, as described hereinbefore, was conducted on the solution containing Example II and the data are given in Table 3.

EXAMPLE III

Into a conventional mixing vessel was added 4.8 grams of manganese carbonate (45.4% of Mn), 151 ml. of water and 37.6 grams of 1-hydroxy-1,1-ethylidene diphosphonic acid. Four additional grams of 1-hydroxy-1,1-ethylidene diphosphonic acid and sufficient 50% sodium hydroxide was intermixed to bring the pH to about 3. The deep purple solution which results turns to pale pink on standing overnight. The solution contains 12.2% on the active basis of 1-hydroxy-1,1-ethylidene diphosphonic acid and contains 1.3 moles of 1-hydroxy-1,1-ethylidene diphosphonic acid per mole of manganese. Six hundred ml. of the aqueous corrosive medium was treated with the above solution so that it contains 50 parts per million of the manganese 1-hydroxy-1,1-ethylidene diphosphonic acid complex. Data from Test 1 conducted on Example III are given in Table 3.

TABLE 3

Corrosion rates on mild Steel (S.A.E. 1018) coupons 5 cm. x 3.5 cm. x 0.32 cm., pH 9.0 to 9.5

| Corrosion inhibitor | Concentration, p.p.m. | Time, hr. | Corrosion rates (m.p.y.) |
|---|---|---|---|
| Corrosive medium | | 70 | 28.5 |
| Example II (nickel 1-hydroxy-1,1-ethylidene diphosphonic acid complex) | 50 | 70 | 18.0 |
| Example III (manganese 1-hydroxy-1,1-ethylidene diphosphonic acid complex) | 50 | 70 | 11.1 |

As can be seen from the data, the nickel and manganese complexes effectively reduce the corrosion rates on mild steel.

1-hydroxy-1,1-ethylidene diphosphonic acid zinc complex was tested in boiler water for its corrosive inhibiting effect on red brass and mild steel. The boiler water contained approximately 30-60 parts per million phosphate and approximately 30-60 parts per million sulfate having a pH of about 14. The corrosive test was carried out at a temperature of 3.14° C. at 1500 p.s.i.g. and with a 50 parts per million 1-hydroxy-1,1-ethylidene diphosphonic acid zinc complex. Approximately 1 liter of boiler blowdown water was charged into a 2 liter bomb and 1 ml. of a stock solution was added to give approximately 50 parts per million of zinc 1-hydroxy-1,1-ethylidene diphosphonic acid. Duplicate coupons of mild steel and red brass measuring 5 cm. x 3.5 cm. x 0.32 cm. were scrubbed with a commercially available cleansing powder and weighed. The coupons were then mounted on insulated brackets so that two coupons were in the liquid phase and two coupons were in the vapor phase. After sealing the bomb, the cycle of pumping down with a vacuum pump and filling with nitrogen is repeated four times. The time of the tests were taken to be roughly from the time the temperature reached 150° C. after starting to heat till it again reached this temperature after turning off the heat.

The results of the test show that at temperatures above 300° C. zinc 1-hydroxy-1,1-ethylidene diphosphonic acid complex significantly reduces the corrosion rates of both red brass and mild steel either completely immersed in the cooling waters or in contact with the vapors of a cooling water system containing the complex. It also demonstrates the stability of the novel compounds of the present invention at elevated temperatures, over 300° C., for extended periods of time.

The novel compound, i.e., zinc 1-hydroxy-1,1-ethylidene diphosphonic acid, of the present invention is particularly effective in reducing corrosion of red brass when used in a boiler condensate system.

In each of the following examples, the organo-phosphorus ligand and the divalent metal ion in the form of its salts was added to the aqueous corrosive medium so that 50 parts per million of the organo-phosphorus ligand divalent metal ion complex was present. The mole ratio of metal ion to organo-phosphorus ligand was about 1:1.3.

EXAMPLE IV

Ingredients: Parts
Aqueous corrosive medium _____ 75,000
1,1-ethylidene diphosphonic acid _____ 3
Zinc oxide _____ 1

EXAMPLE V

Ingredients: Parts
Aqueous corrosive medium _____ 80,000
EDP _____ 3.3
Nickel carbonate _____ 1

EXAMPLE VI

Ingredients: Parts
Aqueous corrosive medium _____ 90,000
EDP _____ 3.5
Manganese carbonate _____ 1

EXAMPLE VII

Ingredients: Parts
Aqueous corrosive medium _____ 90,000
1-hydroxy propylidene diphosphonic acid _____ 3.5
Zinc oxide _____ 1

EXAMPLE VIII

Ingredients: Parts
Aqueous corrosive medium _____ 90,000
Butylidene diphosphonic acid _____ 3.5
Zinc oxide _____ 1

EXAMPLE IX

Ingredients: Parts
Aqueous corrosive medium _____ 65,000
Isopropylidene diphosphonic acid _____ 2.2
Zinc oxide _____ 1

EXAMPLE X

Ingredients: Parts
Aqueous corrosive medium _____ 11,000
Dipotassium 1-hydroxy-1,1-ethylene diphosphonate _____ 4.5
Zinc oxide _____ 1

EXAMPLE XI

Ingredients: Parts
Aqueous corrosive medium _____ 100,000
Disodium 1-hydroxy-1,1-ethylene diphosphonate _____ 4
Zinc oxide _____ 1

Tests 1 and 2 were conducted on each of the above-treated aqueous corrosive media. The corrosion rates in all instances were lower than the untreated corrosive media and the best results were obtained when the metal ion was zinc.

In each of the following examples, a solid compound was prepared of the organo-phosphorus ligand and the metal ion. This complex was intermixed into the aqueous corrosive medium so that 50 parts per million of the said complex was present. The mole ratio of metal ion to organo-phosphorus ligand was about 1:1.3.

EXAMPLE XII

Ingredients: Parts
Aqueous corrosive medium _____ 20,000
1-hydroxy - 1,1 - ethylidene diphosphonic acid zinc complex _____ 1

EXAMPLE XIII

Ingredients: Parts
Aqeous corrosive medium _____ 20,000
1,1-ethylidene diphosphonic acid zinc complex __ 1

EXAMPLE XIV

Ingredients: Parts
Aqueous corrosive medium _____ 20,000
1-hydroxy-1,1-ethylidene diphosphonic acid nickel complex _____ 1

EXAMPLE XV

Ingredients: Parts
Aqueous corrosive medium _____ 20,000
1,1-ethylidene disphosphonic acid nickel complex _____ 1

EXAMPLE XVI

Ingredients: Parts
Aqueous corrosive medium _____ 20,000
Isopropylidene diphosphonic acid zinc complex _____ 1

EXAMPLE XVII

Ingredients: Parts
Aqueous corrosive medium _____ 20,000
Butylidene diphosphonic acid zinc complex ___ 1

Tests 1 and 2 were conducted on the above-treated corrosive solutions and in all cases the corrosion rates are reduced. Especially good results are obtained when the zinc complex is used.

EXAMPLE XVIII

A compressed ball of a standard weight and dimension is prepared containing the following ingredients in the quantities noted.

Parts
1-hydroxy-1,1-ethylidene diphosphonic acid _____ 34
Lignosulfite binder (bindarene) _____ 8
Zinc oxide _____ 16
Inert ingredients _____ 42

The above composition after briquetting is suitable for mechanically measured addition in water treatment wherein a ball feeder is employed.

What is claimed is:

1. A method of inhibiting the corrosion of ferrous metals and non-ferrous metals selected from the group consisting of copper and brass, in contact with an aqueous corrosive medium which comprises maintaining in said medium (1) an organo-phosphorus ligand having the formula

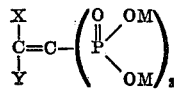

wherein X is selected from the group consisting of hydrogen, hydroxyl, lower alkyl group containing 1 to 4 carbon atoms, and lower alkenyl group containing 2 to 4 carbon atoms; Y is selected from the group consisting of hydrogen, hydroxyl, lower alkyl group containing 1 to 4 carbon atoms, and lower alkenyl group containing 2 to 4 carbon atoms; and M is selected from the group consisting of hydrogen and alkali metal; and (2) a metal ion selected from the group consisting of zinc, nickel and manganese; the mole ratio of the metal ion to ligand being from about 3:1 to about 1:100; and the amount of said ligand and metal ion maintained in said aqueous corrosive medium being at least about 3 parts of each per million.

2. A method of claim 1 wherein said metal ion is zinc.

3. A method of claim 2 wherein said organo-phosphorus ligand is ethylene-1,1-diphosphonic acid.

4. A method of claim 1 wherein the pH of said aqueous corrosive medium is from about 4 to about 12, and the mole ratio of metal ion to ligand is from about 2:1 to about 1:10 and the amount of said ligand and metal ion being from about 10 parts of each per million to about 500 parts of each per million.

5. A method of claim 4 wherein said metal ion is zinc.

6. A method of claim 5 wherein said organo-phosphorus ligand is ethylene-1,1-diphosphonic acid.

7. A process for incorporating a corrosion inhibitor into an aqueous corrosive medium which comprises adding to said medium (1) an organo-phosphorus compound having the formula

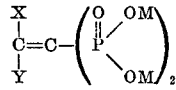

wherein X is selected from the group consisting of hydrogen, hydroxyl, lower alkyl group containing 1 to 4 carbon atoms, and lower alkenyl group containing 2 to 4 carbon atoms; Y is selected from the group consisting of hydrogen, hydroxyl, lower alkyl group containing 1 to 4 carbon atoms, and lower alkenyl group containing 2 to 4 carbon atoms; and M is selected from the group consisting of hydrogen and alkali metal and (2) a soluble zinc salt so that the mole ratio of zinc salt to the organo-phosphorus compound is from about 2:1 to about 1:10; the amount of (1) and (2) maintained in said aqueous corrosive medium is from about 10 parts of each per million to about 500 parts of each per million.

8. A method of claim 7 wherein the soluble zinc salt is zinc sulfate.

9. A method of claim 8 wherein the organo-phosphorus compound is ethylene-1,1-diphosphonic acid.

References Cited

UNITED STATES PATENTS

| | | | |
|---|---|---|---|
| 2,971,019 | 2/1961 | Ladd et al. | 252—389 |
| 3,116,178 | 12/1963 | Upham | 21—2.7 |
| 3,214,454 | 10/1965 | Blaser et al. | 260—502.4 |
| 3,234,124 | 2/1966 | Irani | 210—38 |
| 3,297,578 | 1/1967 | Crutchfield et al. | 252—99 |
| 3,371,046 | 2/1968 | McCord | 252—389 |

RICHARD D. LOVERING, Primary Examiner

I. GLUCK, Assistant Examiner

U.S. Cl. X.R.

21—2.7 R; 252—8.55, 99, 135, 389 A, 389 R; 260—502.4, 961